C. A. R. CAMPBELL.
BAT ROOST.
APPLICATION FILED AUG. 2, 1909.
950,508.
Patented Mar. 1, 1910.
2 SHEETS—SHEET 1.
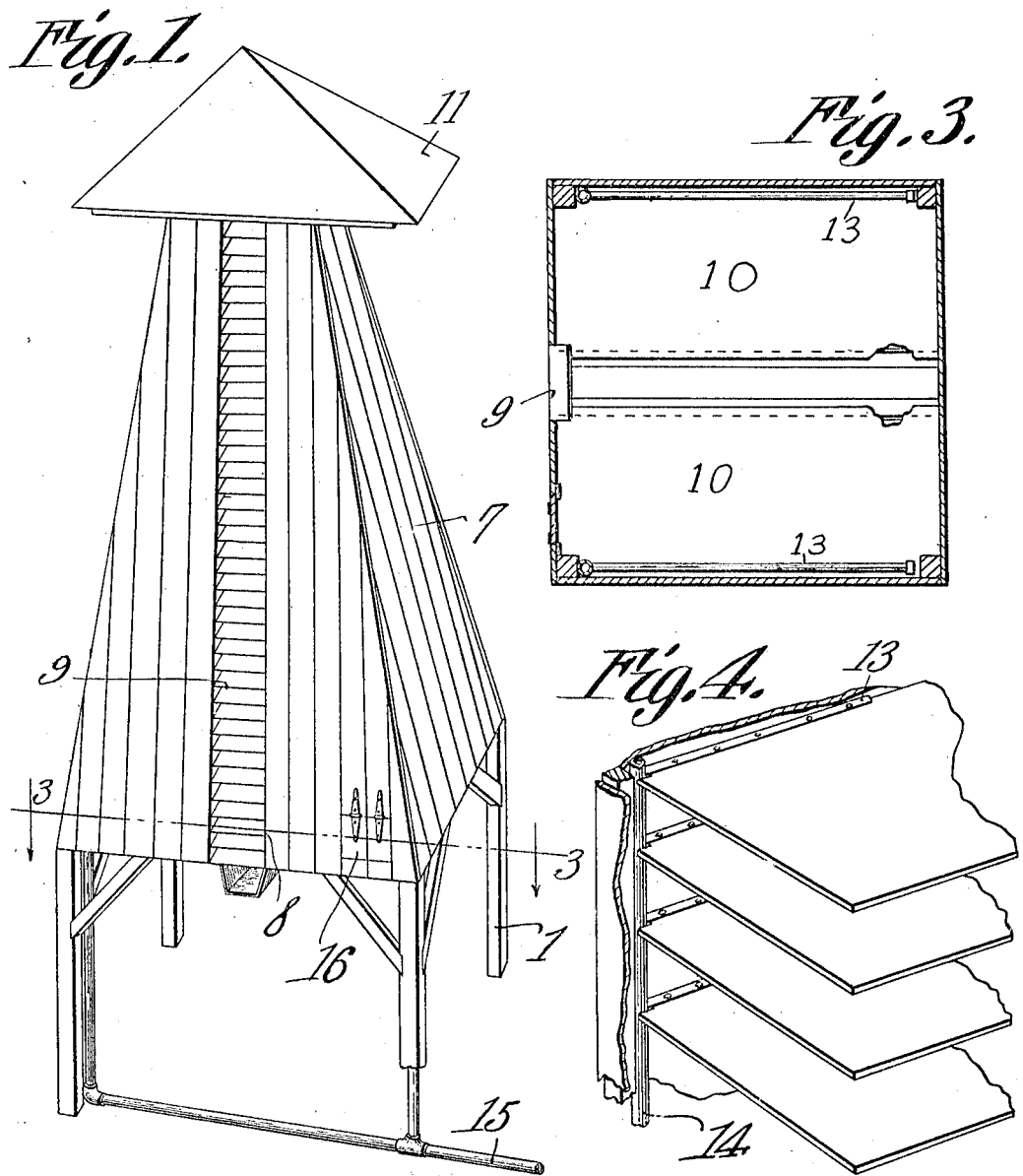

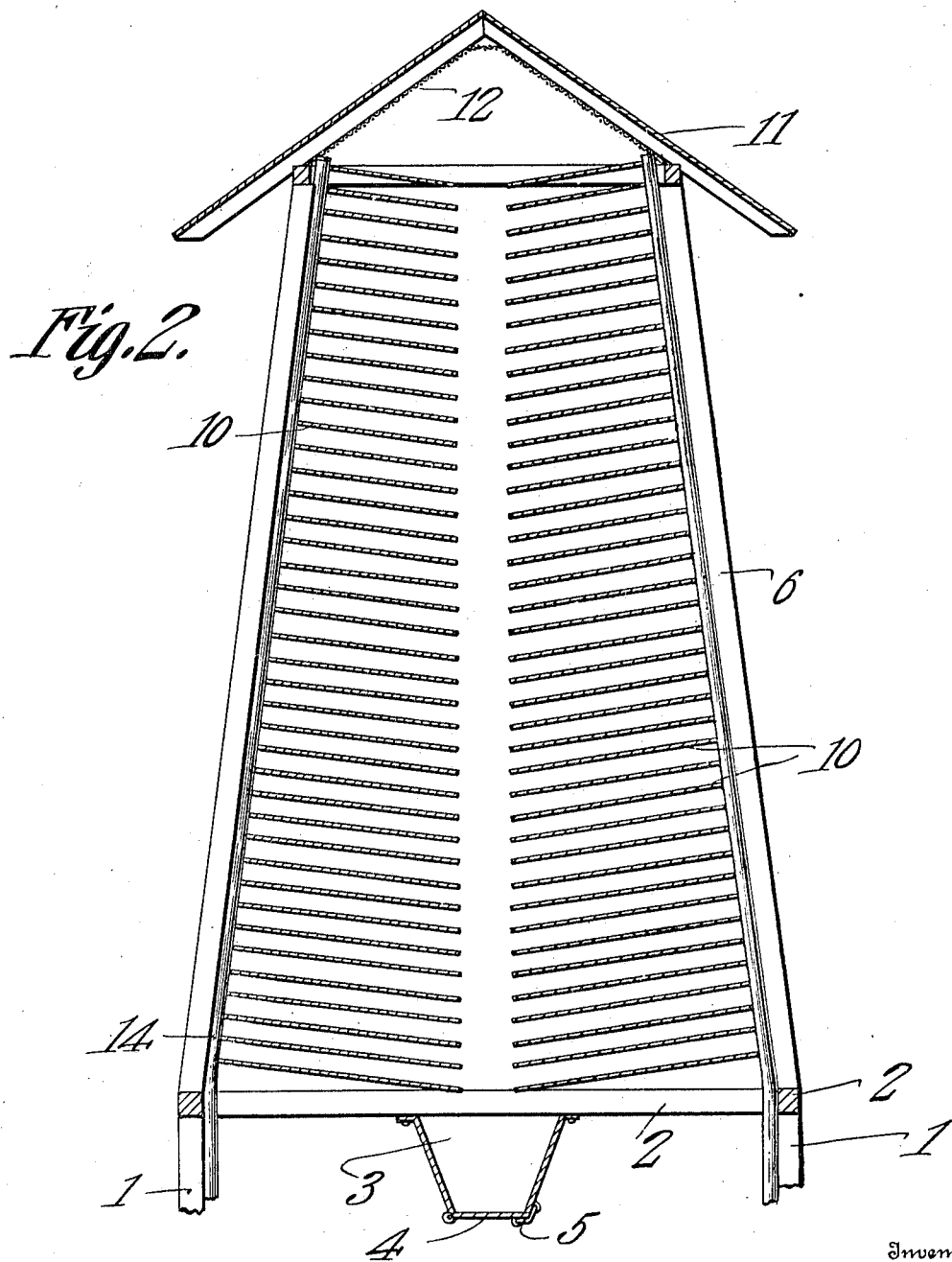

UNITED STATES PATENT OFFICE.

CHARLES A. R. CAMPBELL, OF SAN ANTONIO, TEXAS.

BAT-ROOST.

950,508.     Specification of Letters Patent.     Patented Mar. 1, 1910.

Application filed August 2, 1909. Serial No. 510,773.

*To all whom it may concern:*

Be it known that I, CHARLES A. R. CAMPBELL, a citizen of the United States, residing at San Antonio, in the county of Bexar and State of Texas, have invented a new and useful Bat-Roost, of which the following is a specification.

The object of this invention is to provide a structure in which bats may make their home whereby the destruction of mosquitos will be facilitated owing to the fact that the obnoxious bat feeds largely on mosquitos and also to obtain the valuable guano found in places where bats usually congregate. This object is attained by the provision of a tower which is inclosed so as to be almost entirely without light and which contains means for collecting and discharging the deposits. Such a structure is illustrated in the accompanying drawings and the invention consists in certain novel features of the same, as will be hereinafter first fully described and then pointed out subsequently in the appended claims.

In the drawings, Figure 1 is a perspective view of a complete tower embodying my invention. Fig. 2 is a vertical section of the same. Fig. 3 is a horizontal section thereof, taken on the line 3—3 of Fig. 1. Fig. 4 is a detail perspective view of some of the shelves showing the pipe used to effect cleaning of the shelves and discharge of the contents of the same.

In carrying out my invention, I employ a plurality of posts 1 which are set in the ground and extend some distance above the same, the upper ends of the said posts being connected by suitable sills 2 so as to provide a rigid support for the main portion of the tower. By carrying the posts to a considerable height above the ground I am enabled to drive a wagon under the sills into position to receive the matter collected in the hopper 3 secured in any suitable manner to the sills 2 and depending therefrom in the center of the frame. The hopper is provided with a swinging bottom 4 so that upon releasing the said bottom the contents of the hopper will be discharged into a wagon driven beneath the same, as will be readily understood. Any suitable form of hinge may be employed and the bottom may be held in its upper closed position by any suitable fastening device 5.

Upon the foundation structure presented by the post 1 and the sills 2, I erect a tower consisting of slightly upwardly converging posts 6 and sheathing 7 secured to the outer sides of the said posts. This sheathing 7 extends entirely around the frame presented by the post 6 except at the center of one side where a narrow opening 8 is provided for the entrance and exit of the bats. Within this opening I secure a series of slats or a lattice, indicated at 9, so as to further cut off the light without interfering with the passage of the bats, it being well known that the bats are nocturnal animals. Within the tower or housing, I provide a plurality of shelves 10 which are arranged in two series extending the full height of the tower and inclined so as to converge downwardly toward the center of the tower, the inner edges of the shelves terminating short of the central vertical plane of the tower so as to provide an open space in alinement with the hopper 3 and with the window or opening 8, the said space being narrower than the opening or window so that access may be had to each shelf through the window by the bats. Upon the upper end of the tower I secure a roof 11 which is preferably pyramidal in form and overhangs the sides of the tower so as to deflect rain or snow from the same, and on the under side of the said roof, above the tower, I secure wire netting 12 of mesh sufficiently large to permit the bats to easily hang therefrom.

It will be readily seen that the structure hereinbefore described provides a tower especially adapted for housing bats and that the valuable matter deposited by the bats will be collected upon the shelves and will pass over the same by gravity into the central open space and will then drop into the hopper. The window providing the exit and entrance for the bats is wider than the space between the rows or shelves so that the bats may pass directly through the window onto the shelves or may fly upward between the shelves so as to roost upon the netting 12 on the underside of the roof. In order to facilitate the discharge of the matter upon the shelves, I employ perforated pipes 13 which are located along the upper edges of the shelves so as to discharge compressed air or other fluid directly upon the shelves and thereby force out the matter on the shelves. These pipes lead from mains 14 which are disposed adjacent the corner posts of the frame and extend downward to a feed pipe 15 which may extend to a convenient air compressor or to any other source of supply. If so desired a branch pipe may be provided in the feed pipe 15 so as to permit the supply of a disinfectant or deodorizer to the said pipe in order to disinfect the tower and remove all obnoxious odors therefrom.

In one side of the tower a small door 16 is provided in order that any young bats that might fall from the roost or any of the shelves and drop into the hopper may be returned to the shelves from which they will be carried upward to the roof by their mothers.

The fact that the lower end of the tower is at a considerable height from the ground permits a wagon to be driven under the hopper so as to easily be loaded with the contents of the hopper, and also maintains the bats out of the reach of snakes or other of their natural enemies.

Having thus described my invention, what I claim is:—

1. In a structure for the purpose set forth, the combination of an inclosed elevated tower having a narrow window in one side and without openings in all its other sides, vertical series of parallel shelves within the tower, the said shelves on the opposite sides of the window converging downward toward the plane of the window and having their lower edges in alinement with the window, and a hopper depending from the bottom of the tower and arranged below the edges of the shelves.

2. A structure for the purpose set forth comprising an inclosed tower having a narrow window in one side, slats disposed across the said window, and shelves arranged within the tower and having their edges disposed in alinement with the said window.

In testimony that I claim the foregoing as my own, I have hereto affixed my signature in the presence of two witnesses.

CHAS. A. R. CAMPBELL.

Witnesses:
   JULIUS R. NORTON,
   C. L. McGILL.